United States Patent [19]

Allen

[11] Patent Number: 4,765,671
[45] Date of Patent: Aug. 23, 1988

[54] LOW MODULUS CARGO BED LINER

[75] Inventor: Richard G. Allen, Littleton, Colo.

[73] Assignee: Gates Formed-Fibre Products, Inc., Auburn, Mass.

[21] Appl. No.: 918,942

[22] Filed: Oct. 14, 1986

[51] Int. Cl.⁴ .............................................. B62D 25/10
[52] U.S. Cl. .................................................. 296/39 R
[58] Field of Search ........................ 296/39 R; 428/198

[56] References Cited

U.S. PATENT DOCUMENTS

| | | | |
|---|---|---|---|
| 2,911,253 | 11/1959 | Dewey | 296/39 R |
| 4,279,439 | 7/1981 | Cantieri | 296/39 R |
| 4,424,250 | 1/1984 | Adams et al. | 428/198 |

FOREIGN PATENT DOCUMENTS 36737  3/1983  Japan ................................ 296/39 R Primary Examiner—Robert R. Song
Attorney, Agent, or Firm—Jack E. Ebel; C. H. Castleman, Jr.; H. W. Oberg, Jr.

[57] ABSTRACT

A cargo bed liner system for use in pickup trucks, four-wheel drive vehicles, light utility vehicles and the like, in which rigidified carpeting material made of needle-loomed staple fibers of polypropylene and polyester have been thermoformed to form a floor covering piece, a tail gate covering piece, and two side covering pieces, with flaps on the floor piece being folded upwards to cover the forward panel and any areas of the side panels which have not been covered by the side panel cover pieces. The system is affixed to the vehicle's cargo bed by means of several velcro-type fasteners.

9 Claims, 2 Drawing Sheets

LOW MODULUS CARGO BED LINER

BACKGROUND OF THE INVENTION

This invention pertains to a cargo bed liner system and more particularly to a cargo bed liner system for trucks and other vehicles having large cargo beds for which a liner is desired.

It is becoming more and more common to line the cargo bed of a pickup truck, four-wheel drive vehicle, or light utility vehicle with some type of a lining system. This is done for a variety of reasons. One major reason is to protect the metal of the bed from scratches and minor dents that occur when cargo is being loaded and unloaded. Another common reason is simply for that of aesthetics, as many owners simply do not like the look of bare metal in their cargo bed area. Or, the cargo being loaded may have a fine finish on it that could easily be marred by coming into contact with the bare metal surface of a cargo bed area. For whatever reason, cargo bed lining systems have come into use, utilizing a variety of approaches.

One approach has been to cover the various surfaces of the cargo bed with solid sheets of plywood, in effect constructing a large cabinet for the cargo bed area. Another common approach has been to fabricate rubber sheets to fit against the various sides of a cargo bed. Yet another approach has been to cast a fiberglass or other suitable resin into a unitary piece that simultaneously covers all of the surfaces of the cargo bed. These approaches all do a good job of protecting the metal of the cargo bed from scratches and dents. However, they all suffer from several common shortcomings. Firstly, they are relatively heavy, expensive to ship, unwieldy to store, and difficult and time consuming for a single person to install or remove. Secondly, although they tend to be more aesthetically pleasing than the appearance of the metal cargo bed liner itself, their appearance can still be improved upon by today's design and stylistic standards. Thirdly, they are still not particularly suitable for transporting pieces which have very fine finishes that are easily scratched or marred. Therefore, a need exists in this art for a cargo bed liner system that is light-weight, easy to install or remove, relatively inexpensive to manufacture, relatively inexpensive to ship, capable of easy storage, has an aesthetically pleasing appearance, and that will protect the surfaces or finishes of certain goods being transported. The present invention is a solution to these long felt needs.

SUMMARY OF THE INVENTION

Generally, the invention is a cargo bed liner system capable of use in a cargo bed having a floor, two side panels a forward panel, and a tail gate, that comprises a cover member for the floor and cover members for both side panels, all of which are constructed of a nonwoven textile material. The floor cover member will have one or more cuts and foldable creases in it so that at least a portion of the floor cover member can be folded upwards to cover at least a portion of the side panels and the forward panel. The floor cover panel is connected to the side panels or tailgate by one or more suitable attachment devices.

More specifically, and in one of the more preferred embodiments of the invention, the cargo bed liner is made up of nonwoven textile material of staple fibers of polypropylene and polyester that has been needle-loomed and thermoformed to take on a desired predetermined shape which includes a floor cover member and two side panel cover members attached to opposite edges of the floor cover member so as to mate with and cover the two side panels of the cargo bed. The floor cover member designed to cover the floor of the cargo bed will have had several cuts and creases made in it so that certain portions of it can be folded upwards to cover the tail gate, forward panel, and any portions of the side panels that are not covered by the side panel cover members.

An object of this invention is to provide a cargo bed liner system that is sufficiently rigid to have shape memory so that it can be custom fit to a given model of truck or other vehicle, yet be relatively flexible. Another object of the present invention is to provide a cargo bed liner system that is lighter in weight than present systems, easier to transport, easier to store, and easier to install and remove. Yet another object of the present invention is to provide a cargo bed liner system that is aesthetically more pleasing visually than current systems, and which also has good feel to the touch. Another object of the present invention is to provide a cargo bed liner system that will not scratch or mar finely finished articles that are being transported.

This invention features a soft, fuzzy surface having many of the visual and hand-feel qualitites of good quality carpeting. Another feature of the present invention is that it is conveniently foldable into a relatively small area capable of being shipped and stored more easily than with present systems. Another feature of the present invention is that its respective members are not connected by mechanical means that require extensive installation procedures such as drilling and punching, relying rather on the use of adhesives and velcro-type fasteners.

DETAILED DESCRIPTION OF THE DRAWINGS

Figure 1:
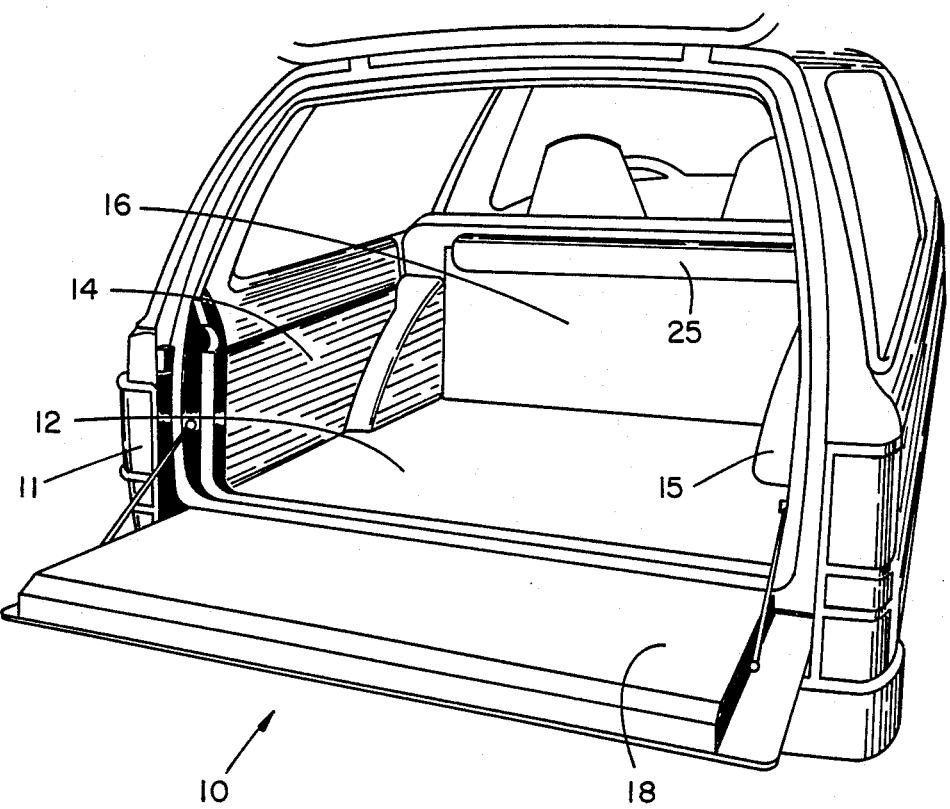
FIG. 1 is a perspective view of the low modulus cargo bed liner installed within the cargo bed area of a typical enclosed four-wheel drive car having a rear seat back in an upright position, showing a floor covering member, tail gate covering member, a side panel covering member, and a left side covering member.
Figure 2:
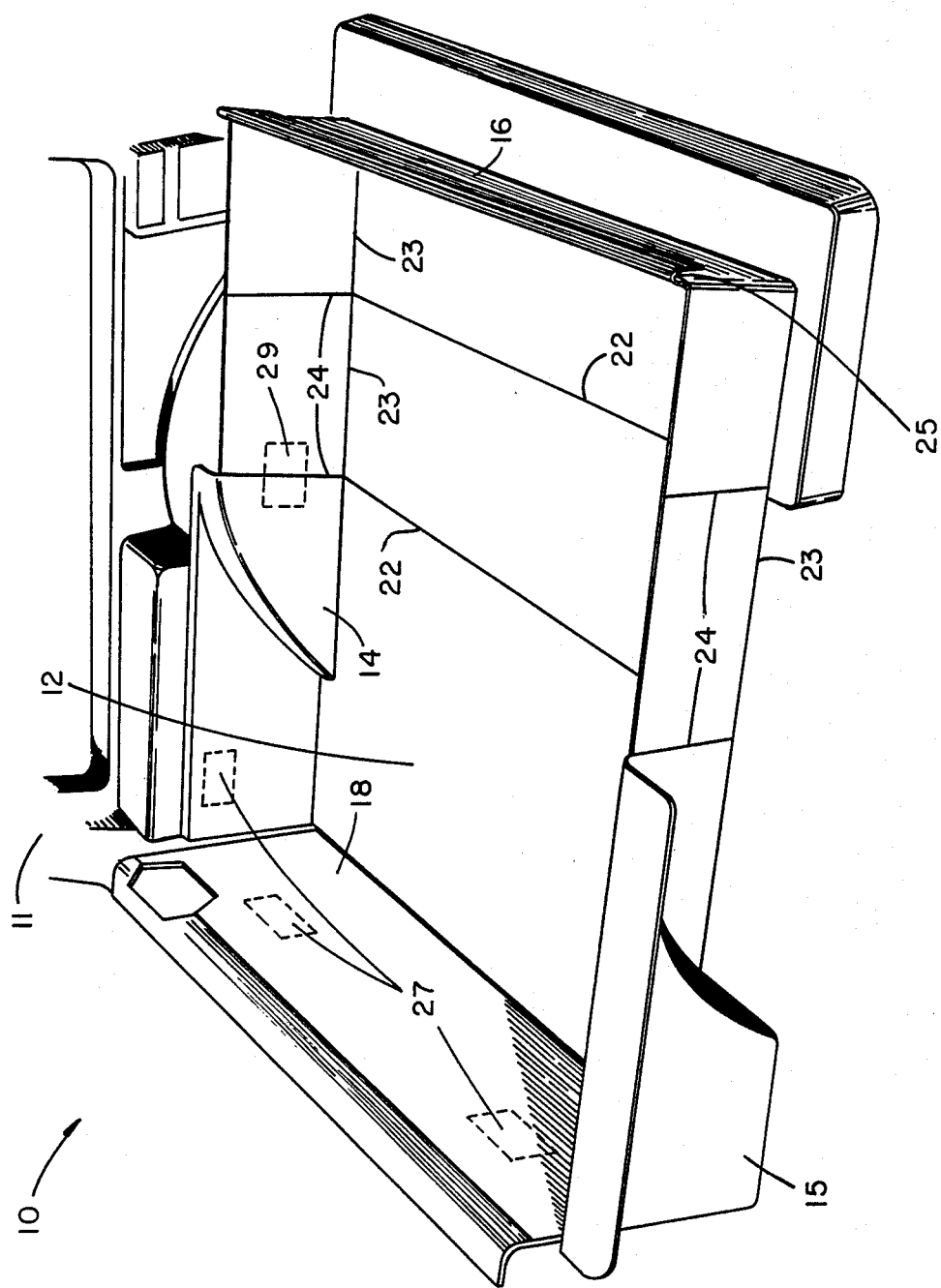
FIG. 2 is a perspective view of the low modulus cargo bed liner of the present invention installed within the cargo bed area of a typical enclosed 4-wheel drive vehicle having a rear seat back in a fully reclined position.

Turning first to FIG. 1 there is seen generally at 10 the low modulus cargo bed liner of the present invention installed within a typical vehicle 11 having the seat back of its rear seat in an upright position. A floor cover member 12 rests on the floor of the cargo bed of the vehicle. At 16 there is a forward panel cover member. As illustrated in FIGS. 1 and 2, first and second side panel cover members 14, 15 are attached to opposite edges of floor cover member 12 and extend outwardly therefrom. Side panel cover members 14, 15 are sized and formed to mate with and cover at least a portion of the side panels of the cargo bed of a vehicle. At 18 there is a tail gate cover member separately attached to the vehicles' tail gate.

Another important feature shown in FIG. 2 is that of the creases 22. Creases 22 in the floor cover member 12 enables what would otherwise be an extremely large, bulky and unwieldy piece to be folded into a smaller area. Furthermore, creases 23 can be made in the floor cover member 12 so as to enable portions of it to be folded upright and thereby cover at least a portion of the side panels of the vehicle. At various positions around the cargo bed, there are illustrated schematically areas 27 which represent velcro-type fastening means for securing various pieces such as the tail gate member 18 to the tail gate. Velcro-type fastening means is also used to connect a left or right side panel cover member with an upfolded section of floor cover member as illustrated at 29. Velcro of course, is a two-component fastening system well known to those skilled in the art, which for its first component utilizes a textile fuzzy face which is adhered to one surface to be fastened and whose second component is a plurality of resilient, usually plastic, J-shaped hooks which snag and grab onto the original fibers of the fuzzy face component when brought into contact with it.

Figure 3:
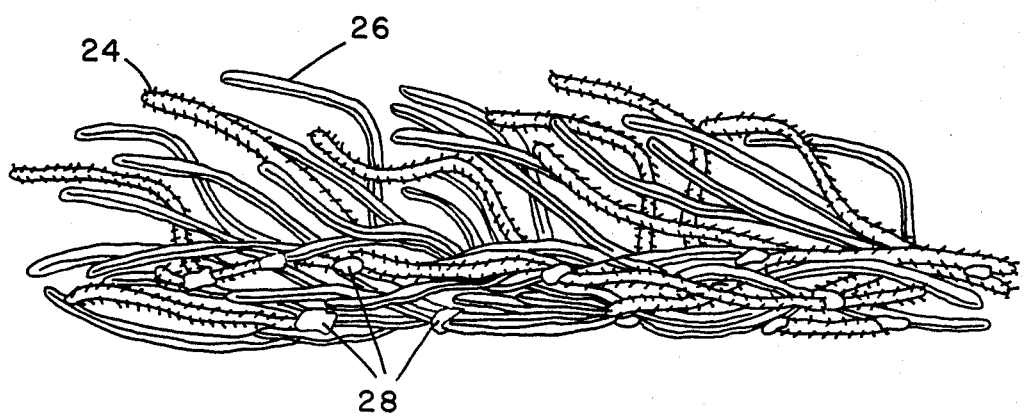
FIG. 3 is schematic drawing illustrating the material make-up of the low modulus cargo bed liner, showing two different types of synthetic textile fibers which have been intermeshed and subjected to heat in order to bond the substrate fibers to one another.

At FIG. 3, there is shown a schematic illustration detailing the porous textile material out of which the low modulus cargo bed liner is fabricated. This material, which is more fully described in U.S. Pat. No. 4,424,250 (issued to Adams and Middleton), the disclosure of which is incorporated herein by reference, is basically comprised of a first type of fiber 24 which has been loomed by means of a needle loom with a second type of fiber 26 into a nonwoven batt, and with either type of fiber or a blend of them found at the surface. Generally these fibers will be staple fibers of a synthetic thermoplastic resin, most preferably some combination of polypropylene and polyester fibers. After having been loomed into a batt, the fibers are thermoformed according to methods well known to those skilled in the art, by subjecting them to conditions of heat and pressure so that the temperature of the batt is raised to the melting point of at least one type of synthetic thermoplasitc resin fibers found therein. When this happens, adhesions form between the first fibers and second fibers as shown at 28 which imparts to the material a sufficient degree of rigidity to give it shape memory. The material however, is by no means as rigid as say, a sheet of acrylic plastic. It has resiliency, which imparts to it a certain degree of shock-absorbing ability and, as can be seen from FIG. 3, has enough nonbonded fibers to give the surface of the material a fuzzy appearance like that of conventionally loomed carpeting.

Having described in great detail the drawings, there will now be described the preferred embodiments of the invention. As stated before, the low modulus cargo bed liner is basically a system having a floor cover member and two side panel cover members are attached to opposite edges of the floor cover member and sized and formed of a shape to mate with and cover at least a portion of the side panels of the cargo bed of a vehicle. In this version of the system, the floor cover member has been cut as at 24 and creased as at 22, 23 so as to have portions that can be folded up to cover the forward panel, tail gate, and any portions of the right and left side panels which are not covered by the side panel cover members. When the forward panel of a cargo bed is a rear seat back, the seat back can be lifted into its upright position, as illustrated in FIG. 1, by folding these portions of floor cover member 12 about creases 23 onto the portion of the floor cover member 12 covering the floor of a cargo bed and further folding a portion of floor cover member 12 along creases 22 into the upright position illustrated in FIG. 1 as will be evident to the skilled artisan. The portion of floor cover member 12 which is in the upright position is illustrated as forward panel member 16 in FIG. 1 and is releasably secured together by means of a rigid, U-shaped clip 17. It will be appreciated that if desired, the system can be broken down into more components, with a fully separated member being formed and cut to size for a tail gate, as well as being able to do this for the forward panel. Generally, the side panel cover members will be attached to the floor cover member by velcro means as described above, well known to those skilled in the art.

Although the most preferred combination of textile fibers will be a blend of polypropylene and polyester fibers, it is also possible to use polyethylene fibers in the product, as well as nylon fibers, aramid fibers or acrylic fibers.

Although the type of textile material described here can be deep molded to cover severely irregular contours, if it is desired, the low modulus cargo bed liner can be so configured as to have separate side wheel well cover members. These would likewise be fastened to the floor cover member and any other side panel cover members, if any, by velcro-type fasteners.

Preparing and manufacturing the low modulus cargo bed liner according to the descriptions above will result in a novel and unique method of making a cargo bed liner system. Having completed construction of the invention, it can be put to use in a predetermined vehicle cargo bed by using an adhesive to adhere one component of a velcro-type system to the cargo bed liner itself, and then contacting it with the second component of the velcro system which is itself adhered to one of the respective components of the low modulus cargo bed liner system.

It is thought that the low modulus cargo bed liner and method of the present invention and many of its attendant advantages will be understood from the foregoing description, and it will be apparent to those skilled in the art that various changes may be made in the form, construction, and arrangement of the parts thereof without departing from the spirit and scope of the invention, or sacrificing all its material advantages. The forms herein described are merely preferred embodiments, and the description herein should not be construed or interpreted as the only embodiments. Although this description has largely discussed application of this invention to covering cargo beds of pickup trucks and light utility vehicles, this is only one major application of the technology, and other applications to the production of other products are not intended to be precluded. The following claims should therefore be interpreted as broadly as is reasonable.

What is claimed is:

1. A cargo bed liner system capable of use in a cargo bed having a floor, a first side panel, a second side panel, a forward panel, and a tailgate, comprising:
    a floor cover member;
    a first side panel cover member attached to a first edge of said floor cover member and having a shape and size to cover at least a portion of said first side panel;

a second side panel cover member attached to a second edge of said floor cover member and having a shape and size to cover at least a portion of said second side panel, said cover members being made of a nonwoven textile material, said floor cover member having a plurality of foldable creases and a plurality of cuts so as to enable at least a portion of said floor cover member to be folded upwards to cover at least a portion of said first side panel, said second side panel, said forward panel, or said tailgate.

2. The article as claimed in claim 1, in which said first side panel cover member and said second side panel cover member are attached to said floor cover member by means of a fastening system characterized by having two components, the first component being a textile surface having a substantially fuzzy face, and the second component being a plurality of resilient, J-shaped hooks that catch and hold the fuzzy face of the first component when the two components are brought into contact with each other.

3. The article as claimed in claim 1, in which the nonwoven textile material is comprised of at least one synthetic resin fiber.

4. The article as claimed in claim 3, in which at least one of the synthetic resin textile fibers is taken from the group consisting of polypropylene, polyester, or polyethylene.

5. The article as claimed in claim 4, in which the non-woven textile material is comprised of a needle-punched nonwoven batt of staple fibers that have been subjected to an elevated temperature sufficiently high to at least partially melt at least one type of synthetic thermoplastic resin fibers therein, and subsequently being allowed to cool, resulting in the fibers at least partially bonding to one another, the article thus having the qualities of being rigidified, yet flexible.

6. A vehicle cargo bed liner, capable of use in a cargo bed having a floor, a first side panel, a second side panel, a forward panel, and a tailgate, comprising:
a floor cover member;
a first side panel cover member attached to a first edge of said floor cover member and having a shape and size to cover a portion of said first side panel;
a second side panel cover member attached to a second edge of said floor cover member and having a shape and size to cover a portion of said second side panel;
a forward panel cover member, said cover members being made of a nonwoven textile material, said floor cover member having a plurality of foldable creases and a plurality of cuts in it to enable at least a portion of said floor cover member to be folded upwards to cover at least a portion of said first side panel, said second side panel, or said forward panel said upwards folded portions of said floor cover member capable of covering that portion of said first side panel and said second side panel which will not be covered by said first side panel cover member and said second side panel cover member.

7. The article as claimed in claim 6, in which the nonwoven textile material is comprised of a blend of polypropylene and polyester fibers.

8. An automotive vehicle cargo bed liner, capable of use in a cargo bed having a floor, a first side panel including a first wheel well, a second side panel including a second wheel well, a forward panel, and a tailgate comprising:
a floor cover member;
a first side panel cover member attached to a first edge of said floor cover member and having a shape and size to cover at least a portion of said first side panel including at least a portion of said first wheel well;
a second side panel cover member attached to a second edge of said floor cover member and having a shape and size to cover at least a portion of said second side panel including at least a portion of said second wheel well; said cover members being made up of a thermoformable nonwoven textile fiber material, said floor cover member having a plurality of foldable creases and a plurality of cuts in it to enable at least a portion of said floor cover member to be folded upwards to cover at least a portion of said first side panel, said second side panel, said forward panel or said tailgate.

9. The article as claimed in claim 8 further comprising:
a tailgate cover member capable of being attached to and covering said tailgate.

* * * * *